Patented Oct. 24, 1939

2,177,407

UNITED STATES PATENT OFFICE 2,177,407

ALCOHOLYSIS OF GLYCERIDES

Virgil L. Hansley, Niagara Falls, N. Y., assignor to E. I. du Pont de Nemours & Company, Wilmington, Del., a corporation of Delaware No Drawing. Application September 21, 1936, Serial No. 101,790

22 Claims. (Cl. 260—410)

This invention relates to the preparation of esters and more particularly to a non-catalytic method of converting fatty acid glycerides to fatty acid esters of monohydric aliphatic alcohols.

Alcoholysis reactions involving fatty acid glycerides are commonly effected by heating the glyceride with a large excess of an aliphatic alcohol in the presence of hydrochloric acid as catalyst. While this method may be used to produce good yields of fatty acid esters of monohydric aliphatic alcohols by heating the reaction mixture for a long period of time at the refluxing temperature, nevertheless, it has several disadvantages when used in large scale commercial operations. Aside from the extremely long reaction time that is necessary to effect good yields of product by this method, the hydrochloric acid catalyst requires the use of relatively expensive corrosion resistant equipment. In addition, the hydrochloric acid is slowly converted by reaction with the alcohol present to the corresponding alkyl chloride, for example, to methyl chloride when methanol is used. This is not only wasteful and costly but causes a gradual and effective lowering of the concentration of the catalyst in the reaction mixture as the reaction proceeds. Furthermore, hydrochloric acid is not entirely suitable as a catalyst for such reactions since strong acids induce decomposition and polymerization reactions when the glyceride involved in the reaction is highly unsaturated.

An object of the present invention is to provide an improved method for producing fatty acid esters of monohydric aliphatic alcohols from fatty acid glycerides in general. Another object is to provide a method for producing such esters in improved yields without the use of a catalyst. A further object is a method for simultaneously alcoholizing and hydrogenating unsaturated fatty acid glycerides to produce saturated fatty acid esters of monohydric aliphatic alcohols. Other objects will be hereinafter apparent.

These objects are accomplished in accordance with the present invention by reacting a fatty acid glyceride with a monohydric aliphatic alcohol under pressure, in the absence of an alcoholysis catalyst at a temperature sufficiently high to effect the alcoholysis reaction but not high enough to cause substantial decomposition of the fatty acid glyceride or the product ester of the monohydric aliphatic alcohol. If the fatty acid glyceride is unsaturated and a saturated ester of a monohydric aliphatic alcohol is desired, the glyceride may be alcoholized and hydrogenated simultaneously by employing, in addition to an excess of the alcoholizing alcohol, a hydrogenation catalyst and subjecting the mixture under hydrogen pressure to a temperature suitable for effecting alcoholysis and hydrogenation.

I have discovered that a reaction temperature of approximately 175°C. is sufficiently high to effect the alcoholysis of a fatty acid glyceride. At a temperature of 150° C. the alcoholysis reaction proceeds at an appreciable rate, which however, is too slow to be of practical value. But, at 175° C. or at higher temperatures, the reaction is rapid and satisfactory conversions may be realized within a reasonable time in the presence of an excess of alcohol. Relatively high temperatures may be employed to increase the rate of reaction providing such temperatures do not cause appreciable decomposition of the fatty acid glyceride or the ester product. In general, I prefer to practice my invention at a temperature of about 200–225° C. although any temperature within the range of 175–300° C. may be employed with good results with most fatty acid glycerides.

Since the alcoholysis reactions under consideration are equilibrium reactions, it is necessary to use an excess of the alcohol in order that good conversions of the glyceride to the simple esters may be realized. When esters of the lower aliphatic alcohols are desired, I have found that 0.75 to 2.0 parts by weight of the alcohol to 1 part by weight of the glyceride provides a suitable excess of the alcohol. Although excellent yields of the simple esters may be obtained by using more than about 2 parts of alcohol, such a large excess is generally undesirable in that subsequent operations involving the distillation and recovery of the excess alcohol then become excessively expensive. When less than about 0.75 parts by weight of alcohol to 1 part of glyceride is employed, conversions of the glyceride to the simple ester are relatively low and the process becomes impractical for commercial use.

To practice my invention, I may mix the glyceride with a suitable excess of the alcohol and heat the mixture to a temperature above about 175° C., e. g. at 200–225° C. under pressure. A convenient method of attaining a suitable pressure for the reaction comprises heating the reaction mixture in an autoclave.

The important factors in the successful practice of my process are, as noted above, the temperature of operation and the concentration of the reactant alcohol in the reaction mixture. In order that the concentration of the reactant alcohol is not excessively lowered during operation of the process at a suitable temperature, it is necessary that the reaction be carried out under pressure. The required pressure may be conveniently attained by heating a suitable reaction mixture in an autoclave within the temperature range of 175–300° C. If desired, and provided a sufficient excess of reactant alcohol is employed, vapors may be periodically bled off from the autoclave, although I have found that excellent results may be obtained without bleeding. My process may be operated at any pressure corresponding to the vapor pressure of the reaction mixture at temperatures within the limits of 175–300° C. The pressure for a given temperature of operation within the above range will vary somewhat with the reactants employed and also with the proportion of the reactants and reaction products in the reaction mixture.

My process is particularly well suited for use with the lower monohydric aliphatic alcohols such as methyl, ethyl, propyl, butyl and amyl alcohols, and isomers of the latter three alcohols. When any of these alcohols are used, they may be employed in quantities as specified in the previous paragraph. My process also may be practiced employing monohydric aliphatic alcohols containing more than 6 carbon atoms per molecule with good results, provided a larger excess of the alcohol is employed. Although my process is suitable for the preparation of fatty acid esters of monohydric alcohols generally, I have found it to be especially well adapted to the preparation of the methyl and ethyl esters of fatty acids. These esters may be produced in excellent yields in accordance with my invention and may be conveniently separated from the reaction mixture without excessive decomposition by distillation under reduced pressure.

I prefer to employ alcohol in an anhydrous state as one of the reactants in my process. However, small quantities of water may be present without appreciably lowering the conversion to simple esters. When an appreciable quantity of water is present in the reaction mixture, hydrolysis of the glyceride or the ester reaction product becomes appreciable, thus lowering the yield of ester.

The present invention may be employed advantageously to convert either saturated or highly unsaturated glycerides to the corresponding saturated or unsaturated simple esters. I have found that there is no great tendency for decomposition and polymerization reactions to occur in my process, provided the reaction temperature does not exceed approximately 300° C. In general, improved yields, which in some cases are practically quantitative, of simple esters are obtainable from fatty acid glycerides in accordance with the present invention.

I have further discovered that an unsaturated fatty acid glyceride may be simultaneously alcoholized and hydrogenated to produce saturated simple esters of fatty acids. In order for alcoholysis and hydrogenation to be effected simultaneously it is only necessary that a hydrogenation catalyst be present in the above described mixture of unsaturated glyceride and monohydric aliphatic alcohol and that the mixture be subjected to a hydrogen pressure of about 500 lbs./sq. in. or greater during the alcoholysis. In general, a hydrogen pressure of 500 to 1000 lbs./sq. in. is entirely satisfactory although higher pressures may be employed with good results. Any efficient hydrogenation catalyst may be employed. I have found the ordinary nickel catalyst, supported on kieselguhr, to be entirely satisfactory. The concentration of hydrogenation catalyst required is the same as that normally employed in hydrogenation of glycerides and similar material. I have found that temperatures suitable for effecting alcoholysis alone are also suitable for effecting the combined alcoholysis and hydrogenation.

The following examples illustrate but do not limit my invention:

*Example I*

Palm oil, 1 kg., was heated in an autoclave with 1 kg. of methanol to 200° C. for 10 hours. The reaction mixture was cooled and washed with water to remove the by-product glycerol and excess methanol. The methyl esters obtained, boiling at 190–213° C. at 15 mm. pressure, corresponded to a 93.5% conversion. The iodine number of the original oil was 50.9 whereas that of the product was 48.7.

*Example II*

Palm oil, 1 kg., was heated as in Example I, to 200° C. with an equal weight of methanol, but in addition, 50 gms. of a supported (on kieselguhr) nickel catalyst was incorporated into the charge. During the heating the mixture was subjected to a hydrogen pressure sufficient to give a total pressure of 1000 lbs./sq. in. After 10 hours of reaction time the mixture was cooled, filtered to remove the catalyst, and washed with water. The yield of methyl ester mixture obtained, boiling at 190–213° C. at 15 mm. pressure, was 98.0% of the theoretical. The iodine number of the original oil was 50.9 and of the product 9.9.

*Example III*

Castor oil (Baker's #3 grade), 535 gms., together with 1000 cc. of methanol and 25 gms. of supported nickel catalyst were placed in an autoclave and subjected to hydrogen pressure sufficient to give a total pressure of 1000 lbs./sq. in. at a temperature of 200° C. After 14 to 16 hours under these conditions methyl hydroxy stearate in an amount equivalent to an 88.3% conversion was isolated. The iodine number of the product (Wijs) was 3.1 and the saponification number was 178.

*Example IV*

Chinawood oil, 552 gms., was heated in an autoclave with 1000 cc. of methanol at 175° C. for 16 hours. After washing, the reaction product was distilled at a pressure of 2 mm. A yield of 376 gms. or 68.1% of a mixture of methyl esters, boiling at 165–190° C. was obtained. The saponification number of the product was 193 and its content of free acid, calculated as oleic acid, was 0.27%.

*Example V*

Coconut oil, 486 gms. and 1000 cc. of absolute ethanol were heated together in an autoclave at 175° C. After a reaction time of 16 hours the by-product glycerol and excess ethanol were removed by washing with water and the mixture of ethyl esters distilled in a vacuum. The product, consisting of a mixture of the ethyl esters of the acid constituents of the coconut oil, boiling at 65–210° C. at 1 to 2 mm. pressure, was 428 gms. corresponding to a 77% conversion. The product had a saponification number of 230 and contained free acid, calculated as lauric acid, equivalent to 0.45%.

Example VI

Menhaden oil, 500 gms. heated with 500 gms. of methanol at 300° C. for 5.5 hrs. yielded, upon vacuum distillation, methyl esters equivalent to a 79% conversion. 18.4% of the original oil remained unconverted.

The above examples illustrate but a few of the many preparations for which the present invention may be employed. Various modifications of the process illustrated by the above examples may be utilized without departing from the scope of the present invention.

The present process for the alcoholysis of glycerides to produce fatty acid glycerides of monohydric aliphatic alcohols is well adapted for operation in a continuous manner. For example, a fatty acid glyceride and a suitable excess of an alcohol may be forced through a reaction chamber under pressure and at a temperature suitable for effecting the alcoholysis in the reaction chamber, and the reaction products and excess alcohol separated upon discharge from the reaction chamber. In such a continuous operation I prefer to employ temperatures in the neighborhood of 225-300° C. in order that the reaction may be rapidly effected, although temperatures as low as 175° C. may be employed if the rate of passage of the reaction mixture through the reaction chamber is sufficiently slow. The rate of passage of the reaction mixture through the reaction chamber may be regulated so that a substantial amount of conversion is effected before the mixture is discharged from the chamber. If relatively high temperatures are employed such as temperatures of 225-300° C. the rate of passage through the chamber may be appreciably greater than the rate required when lower temperatures are employed in order to produce the same degree of conversion.

I claim:

1. The process comprising reacting a fatty acid glyceride and a monohydric aliphatic alcohol in the absence of an alcoholysis catalyst at a temperature of not less than 175° C. and under a pressure corresponding to said temperature in a closed system, to produce a fatty acid ester of said alcohol.

2. The process comprising reacting a fatty acid glyceride and a monohydric aliphatic alcohol in the absence of an alcoholysis catalyst at a temperature of about 175 to 300° C. and under a pressure corresponding to said temperature in a closed system, to produce a fatty acid ester of said alcohol.

3. The process comprising reacting a fatty acid glyceride and a monohydric aliphatic alcohol in the absence of an alcoholysis catalyst at a temperature of about 200 to 225° C. and under a pressure corresponding to said temperature in a closed system, to produce a fatty acid ester of said alcohol.

4. The process comprising reacting a fatty acid glyceride and a monohydric aliphatic alcohol in the absence of an alcoholysis catalyst in a weight ratio of 1 part glyceride to about 0.75 to 2 parts alcohol at a temperature of not less than 175° C. and under a pressure corresponding to said temperature in a closed system, to produce a fatty acid ester of said alcohol.

5. The process comprising reacting a fatty acid glyceride and a monohydric aliphatic alcohol in the absence of an alcoholysis catalyst in a weight ratio of 1 part glyceride to about 0.75 to 2 parts alcohol at a temperature of 175 to 300° C. and under a pressure corresponding to said temperature in a closed system, to produce a fatty acid ester of said alcohol.

6. The process comprising reacting a fatty acid glyceride and a monohydric aliphatic alcohol in the absence of an alcoholysis catalyst in a weight ratio of 1 part glyceride to about 0.75 to 2 parts alcohol at a temperature of about 200 to 225° C. and under a pressure corresponding to said temperature in a closed system, to produce a fatty acid ester of said alcohol.

7. The process comprising subjecting a mixture comprising a fatty acid glyceride and a monohydric aliphatic alcohol containing less than 6 carbon atoms per molecule in a weight ratio of 1 part of glyceride to about 0.75 to 2 parts of alcohol to a temperature of about 175-300° C. in the absence of an alcoholysis catalyst and under a pressure corresponding to said temperature in a closed system, for a sufficient time to effect conversion of said glyceride to a fatty acid ester of said alcohol.

8. The process comprising subjecting a mixture comprising a fatty acid glyceride and a monohydric aliphatic alcohol containing less than 6 carbon atoms per molecule in a weight ratio of 1 part of glyceride to about 0.75 to 2 parts of alcohol to a temperature of about 200-225° C. in the absence of an alcoholysis catalyst and at a pressure corresponding to said temperature in a closed system, for a sufficient time to effect conversion of said glyceride to a fatty acid ester of said alcohol.

9. The process comprising subjecting a mixture comprising a fatty acid glyceride and methanol in a weight ratio of 1 part glyceride to about 1 part methanol in a closed system to heat at a temperature of about 175 to 300° C. in the absence of an alcoholysis catalyst and under a corresponding pressure to produce a fatty acid ester of methanol.

10. The process comprising subjecting a mixture comprising a fatty acid glyceride and methanol in a weight ratio of 1 part glyceride to about 1 part methanol in a closed system to heat at a temperature of about 200 to 225° C. in the absence of an alcoholysis catalyst and under a corresponding pressure to produce a fatty acid ester of methanol.

11. The process comprising subjecting a mixture comprising a fatty acid glyceride and ethanol in a weight ratio of 1 part of glyceride to about 1 part of ethanol in a closed system to heat at a temperature of about 175 to 300° C. in the absence of an alcoholysis catalyst and under a corresponding pressure to produce a fatty acid ester of ethanol.

12. The process comprising subjecting a mixture comprising a fatty acid glyceride and ethanol in a weight ratio of 1 part of glyceride to about 1 part of ethanol in a closed system to heat at a temperature of about 200 to 225° C. in the absence of an alcoholysis catalyst and under a corresponding pressure to produce a fatty acid ester of ethanol.

13. The process for producing a methyl ester of a fatty acid comprising continuously forcing a fatty acid glyceride and methanol together while maintaining a weight ratio of 1 part of said glyceride to about 0.75 to 2 parts of said methanol through a reaction chamber maintained at a temperature of 175 to 300° C. in the absence of an alcoholysis catalyst and under a pressure corresponding to said temperature in a closed system, at such a rate that a substantial conversion of said glyceride to said ester is effected and separating the reaction products and excess methanol discharged from said reaction chamber.

14. The process for producing a methyl ester of a fatty acid comprising continuously forcing a fatty acid glyceride and methanol together while maintaining a weight ratio of 1 part of said glyceride to about 0.75 to 2 parts of said methanol through a reaction chamber maintained at a temperature of 225 to 300° C. in the absence of an alcoholysis catalyst and under a pressure corresponding to said temperature in a closed system, at such a rate that a substantial conversion of said glyceride to said ester is effected and separating the reaction products and excess methanol discharged from said reaction chamber.

15. The process for producing an ethyl ester of a fatty acid comprising continuously forcing a fatty acid glyceride and ethanol together while maintaining a weight ratio of 1 part of said glyceride to about 0.75 to 2 parts of said ethanol through a reaction chamber maintained at a temperature of 175 to 300° C. in the absence of an alcoholysis catalyst under a pressure corresponding to said temperature in a closed system, at such a rate that a substantial conversion of said glyceride to said ester is effected and separating the reaction products and excess ethanol discharged from said reaction chamber.

16. The process for producing an ethyl ester of a fatty acid comprising continuously forcing a fatty acid glyceride and ethanol together while maintaining a weight ratio of 1 part of said glyceride to about 0.75 to 2 parts of said ethanol through a reaction chamber maintained at a temperature of 225 to 300° C. in the absence of an alcoholysis catalyst under a pressure corresponding to said temperature in a closed system, at such a rate that a substantial conversion of said glyceride to said ester is effected and separating the reaction products and excess ethanol discharged from said reaction chamber.

17. The process for preparing a saturated fatty acid ester of a monohydric aliphatic alcohol containing less than 6 carbon atoms per molecule which comprises subjecting a mixture comprising an unsaturated fatty acid glyceride and said alcohol in a weight ratio of 1 part of glyceride to about 0.75 to 2 parts of alcohol in the presence of a hydrogenation catalyst to a hydrogen pressure of not less than about 500 lbs. per sq. in. at a temperature of 175 to 300° C., in the absence of an alcoholysis catalyst.

18. The process for preparing a saturated fatty acid ester of a monohydric aliphatic alcohol containing less than 6 carbon atoms per molecule which comprises subjecting a mixture comprising an unsaturated fatty acid glyceride and said alcohol in a weight ratio of 1 part of glyceride to about 0.75 to 2 parts of alcohol in the presence of a hydrogenation catalyst to a hydrogen pressure of about 500 to 1000 lbs./sq. in at a temperature of about 200 to 225° C., in the absence of an alcoholysis catalyst.

19. The process for preparing a saturated fatty acid ester of methanol which comprises subjecting a mixture comprising an unsaturated fatty acid glyceride and methanol in a weight ratio of about 1:1 in the presence of a nickel hydrogenation catalyst to a hydrogen pressure of about 500 to 1000 lbs./sq. in. at a temperature of 175 to 300° C., in the absence of an alcoholysis catalyst.

20. The process for preparing a saturated fatty acid ester of methanol which comprises subjecting a mixture comprising an unsaturated fatty acid glyceride and methanol in a weight ratio of about 1:1 in the presence of a nickel hydrogenation catalyst to a hydrogen pressure of about 500 to 1000 lbs./sq. in. at a temperature of about 200 to 225° C., in the absence of an alcoholysis catalyst.

21. The process for preparing a saturated fatty acid ester of ethanol which comprises subjecting a mixture comprising an unsaturated fatty acid glyceride and ethanol in a weight ratio of about 1:1 in the presence of a nickel hydrogenation catalyst to a hydrogen pressure of about 500 to 1000 lbs./sq. in. at a temperature of 175 to 300° C., in the absence of an alcoholysis catalyst.

22. The process for preparing a saturated fatty acid ester of ethanol which comprises subjecting a mixture comprising an unsaturated fatty acid glyceride and ethanol in a weight ratio of about 1:1 in the presence of a nickel hydrogenation catalyst to a hydrogen pressure of about 500 to 1000 lbs./sq. in. at a temperature of about 200 to 225° C., in the absence of an alcoholysis catalyst.

VIRGIL L. HANSLEY.